US008311390B2

(12) United States Patent
Berry

(10) Patent No.: US 8,311,390 B2
(45) Date of Patent: Nov. 13, 2012

(54) SYSTEMS AND METHODS FOR IDENTIFYING PRE-INSERTED AND/OR POTENTIAL ADVERTISEMENT BREAKS IN A VIDEO SEQUENCE

(75) Inventor: Matthew G. Berry, Raleigh, NC (US)

(73) Assignee: Digitalsmiths, Inc., Durham, NC (US)

( * ) Notice: Subject to any disclaimer, the term of this patent is extended or adjusted under 35 U.S.C. 154(b) by 804 days.

(21) Appl. No.: 12/466,167

(22) Filed: May 14, 2009

(65) Prior Publication Data
US 2009/0285551 A1 Nov. 19, 2009

Related U.S. Application Data

(60) Provisional application No. 61/053,184, filed on May 14, 2008.

(51) Int. Cl.
*H04N 9/82* (2006.01)
(52) U.S. Cl. .................. 386/249; 386/248; 386/250
(58) Field of Classification Search .................. 386/249
See application file for complete search history.

(56) References Cited

U.S. PATENT DOCUMENTS

| | | | |
|---|---|---|---|
| 5,267,351 A | 11/1993 | Reber et al. | |
| 5,537,528 A | 7/1996 | Takahashi et al. | |
| 5,630,121 A | 5/1997 | Braden-Harder et al. | |
| 5,650,941 A | 7/1997 | Coelho et al. | |
| 5,655,117 A | 8/1997 | Goldberg et al. | |
| 5,832,495 A | 11/1998 | Gustman | |
| 5,903,892 A | 5/1999 | Hoffert et al. | |
| 5,956,729 A | 9/1999 | Goetz et al. | |
| 6,032,156 A | 2/2000 | Marcus | |
| 6,134,380 A | 10/2000 | Kushizaki | |
| 6,154,601 A | 11/2000 | Yaegashi et al. | |
| 6,172,675 B1 | 1/2001 | Ahmad et al. | |
| 6,192,183 B1 | 2/2001 | Taniguchi et al. | |
| 6,195,458 B1 | 2/2001 | Warnick et al. | |
| 6,249,280 B1 | 6/2001 | Garmon et al. | |
| 6,285,361 B1 | 9/2001 | Brewer et al. | |
| 6,292,620 B1 | 9/2001 | Ohmori et al. | |
| 6,327,420 B1 | 12/2001 | Furukawa | |
| 6,330,004 B1 | 12/2001 | Matsuzawa et al. | |

(Continued)

OTHER PUBLICATIONS

V. Milkli, H. Kaerdi, P. Kulu, M. Besterci, "Characterization of Powder Particle Morphology," Proceedings of Estonian Acad. of Sci. Eng. vol. 7, 2001, pp. 22-34.

(Continued)

*Primary Examiner* — Jamie Atala
(74) *Attorney, Agent, or Firm* — John L. Sotomayor

(57) ABSTRACT

The present disclosure relates to systems and methods for identifying advertisement breaks in digital video files. Generally, an advertisement break identification module receives a digital video file and generates an edge response for each of one or more frames extracted from the video file. If one of the generated edge responses for a particular frame is less than a predefined threshold, then the module identifies the particular frame as the start of an advertisement break. The module then generates further edge responses for frames subsequent to the identified particular frame. Once an edge response is generated for a particular subsequent frame that is greater than the threshold, it is identified as the end of the advertisement break. The video file may then be manipulated or transformed, such as by associating metadata with the advertisement break for a variety of uses, removing the advertisement break from the video file, etc. Optionally, various time and/or frame thresholds, as well as an audio verification process, are used to validate the identified advertisement break.

25 Claims, 7 Drawing Sheets

ADVERTISEMENT BREAK "START TIME" IDENTIFICATION PROCESS

U.S. PATENT DOCUMENTS

| | | | |
|---|---|---|---|
| 6,895,407 | B2 | 5/2005 | Romer et al. |
| 7,805,052 | B2 * | 9/2010 | Nakamura et al. ............ 386/326 |
| 7,962,007 | B2 * | 6/2011 | Abe et al. ...................... 386/249 |
| 2002/0089646 | A1 | 7/2002 | Chang |
| 2002/0108112 | A1 | 8/2002 | Wallace et al. |
| 2004/0019524 | A1 | 1/2004 | Marshall |

OTHER PUBLICATIONS

G. Mori, X. Ren, A. Efros, J. Malik, "Recovering Human Body Configurations: Combining Segmentation and Recognition," IEEE CS Conf. Computer Vision and Pattern Recognition, 2004.

M. Partio, B. Cramariuc, M. Gabbouj, A. Visa, "Rock Texture Retrieval Using Gray Level Co-Occurrence Matrix," 5th Nordic Signal Processing Symposium, Oct. 2002.

M. Peura, J. Iivarinen, "Efficiency of Simple Shape Descriptors," Proceedings of the Third International Workshop on Visual Form, Capri, Italy, May 1997, pp. 1-9.

P. Quelhas, J. Odobez, "Natural Scene Image Modeling Using Color and Texture Visterms," Lecture Notes in Computer Science, Springer Berlin/Heidelberg, vol. 4017, Jun. 30, 2006, pp. 411-421.

N. Serrano, A. Savakis, J.. Luo, "A Computationally Efficient Approach to Indoor/Outdoor Scene Classification," Proceedings of 16th International Conference on Pattern Recognition, 2002, vol. 4, p. 40146.

J. Shotton, M. Johnson, R. Cipolla, "Semantic Texton Forests for Image Categorization and Segmentation," IEEE Computer Vision and Pattern Recognition, 2008, pp. 1-8.

A. Torralba, A. Olivia, "Statistics of Natural Image Categories," Network: Computation in Neural Systems, Institute of Physics Publishing, 2003, vol. 14, pp. 391-412.

A. Vailaya, A. Jain, H.J. Zhang, "On Image Classification: City Images vs. Landscapes," Content-Based Access of Image and Video Libraries, 1998, Proceedings, IEEE Workshop, Jun. 21, 1998, pp. 1-23.

M. Varma, A. Zisserman, "A Statistical Approach to Texture Classification from Single Images," Kluwer Academic Publishers, 2004, Netherlands.

J. Vogel, B. Schiele, "Natural Scene Retrieval based on Semantic Modeling Step," International Conference on Image and Video Retrieval CIVR 2004, Jul. 2004, Dublin, Ireland.

B.C. Russell, A. Torralba, K. Murphy, and W. Freeman, "LabelMe: A database and web-based tool for image annotation," International Journal of Computer Vision, vol. 77, Issue 1-3, May 2008, pp. 157-173.

Z. Rasheed, M. Shah, "Scene Detection in Hollywood Movies and TV Shows," IEEE Computer Society Conference on Computer Vision and Pattern Recognition, vol. 2, Feb. 27, 2003, pp. 1-8.

C.C. Gotlieb, H.E. Kreyszig, "Texture descriptors based on co-occurrence matrices." Computer Vision, Graphics and Image Processing, Computer Vision, Graphics and Image Processing, 51: 1990, pp. 76-80.

J. Luo, A. Savakis, "Indoor vs Outdoor Classification of Consumer Photographs Using Low-Level and Semantic Features," Image Processing, 2001 International Conference, Oct. 2001, vol. 2, 745-748.

Sen-Ching S. Cheung and Avideh Zakhor, Efficient Video Similarity Measurement with Video Signature, Department of Electrical Engineering and Computer Sciences, University of California, Berkeley, CA, 94720, USA, pp. 1-33.

X. Hua, X. Chen and H. Zhang, "Robust Video Signature Based on Ordinal Measure," Microsoft Research Asia, Beijing 100080, China, pp. 1-4.

A. Bosch, X. Munoz, R. Marti, "A Review: Which is the best way to organize/classify images by content?" Image Vision Computing 2006.

A. Bosch, A Zisserman, X. Munoz, "Scene Classification Via pLSA," Computer Vision and Robotics Group, Girona.

A. Bosch, A Zisserman, X. Munoz, "Scene Classification Using A Hybrid Generative/Discriminative Approach," IEEE Transactions on Pattern Analysis and Machine Intelligence, vol. 30, No. 4, Apr. 2008, pp. 1-37-40.

M. Boutell, J. Luo, C. Brown, "Factor-graphs for Region-base Whole-scene Classification," Proceedings of the 2006 Conf. on Computer Vision and Pattern Recognition Workshop, IEEE Computer Society, 2006.

M. Boutell, J. Luo, R.T. Gray, "Sunset Scene Classification Using Simulated Image Recomposition," Proceedings of the 2003 Int'l Conf. on Multimedia and Expo, IEEE Computer Society, 2003, pp. 37-40.

Y. Chen, J.Z. Wang, "Image Categorization by Learning and Reasoning with Regions," Journal of Machine Learning Research, 2004, vol. 5, pp. 913-939.

L. Fei-Fei, P. Perona, "A Bayesian Hierarchical Model for Learning Natural Scene Categories," Proceedings of the 2005 IEEE Computer Society Conference on Computer Vision and Pattern Recognition, IEEE Computer Society, 2005, pp. 524-531.

P. Felzenszwalb, D. Huttenlocher, "Efficient Graph-Based Image Segmentation," International Journal of Computer Vision, Sep. 2004, vol. 59, Issue 2, Kluwer Academic Publishers, pp. 167-181.

J. Fox, R. R Castano, R. Anderson, "Onboard Autonomous Rock Shape Analysis for Mars Rovers," IEEE Aerospace Conference Proceedings, Paper #276, Mar. 2002.

G. Heidemann, "Unsupervised Image Categorization," Image Vision Computing 23, 2005, pp. 861-876.

D. Hoiem, A. Efros, M. Hebert, "Geometric Context from a Single Image," International Conference of Computer Vision (ICCV), IEEE, Oct. 2005, pp. 1-8.

M. Israel, E. Van Den Broek, P. Van Der Putten, "Automating the Construction of Scene Classifiers for Content-Based Video Retrieval," MDM/DKK'04, Aug. 22, 2004, Seattle, WA, USA.

J. Kivinen, E. Sudderth, M. Jordan, "Learning Multiscale Representations of Natural Scenes Using Dirichlet Processes," IEEE 11th International Conference on Computer Vision, 2007.

S. Lazebnik, C. Schmid, J. Ponce, "Beyond Bags of Features: Spatial Pyramid Matching for Recognizing Natural Scene Categories," Computer Vision and Pattern Recognition, 2006 IEEE Computer Science Society Conference, vol. 2, 2006, pp. 2169-2178.

L. Lepisto, I. Kunttu, J. Autio, A. Visa, "Comparison of Some Content-Based Image Retrieval Systems with Rock Texture Images, " Proceedings of 10th Finnish AI Conference, Dec. 2002.

T. Leung, J. Malik, "Representing and Recognizing the Visual Appearance of Materials Using Three Dimensional Textons," International Journal of Computer Vision, 43, 2001, pp. 29-44.

J. Li, J. Wang, "Automatic Linguistic Indexing of Pictures by a Statistical Modeling Approach," IEEE Transactions on Pattern Analysis and Machine Intelligence, vol. 25, No. 9, Sep. 2003.

* cited by examiner

ADVERTISEMENT BREAK IDENTIFICATION SYSTEM

ADVERTISEMENT BREAK IDENTIFICATION PROCESS

ADVERTISEMENT BREAK "START TIME" IDENTIFICATION PROCESS

EXEMPLARY FRAME INDICATING EDGE PIXELS

ADVERTISEMENT BREAK "STOP TIME" IDENTIFICATION PROCESS

AUDIO VERIFICATION PROCESS

SYSTEMS AND METHODS FOR IDENTIFYING PRE-INSERTED AND/OR POTENTIAL ADVERTISEMENT BREAKS IN A VIDEO SEQUENCE

CROSS REFERENCE TO RELATED APPLICATION

This application claims the benefit under 35 U.S.C. §119 (e) of U.S. Provisional Patent Application No. 61/053,184, filed May 14, 2008, and entitled "Methods for Detecting Ad Breaks in a Video Sequence," which is incorporated herein by reference as if set forth herein in its entirety.

TECHNICAL FIELD

The present systems and methods relate generally to identifying specific video content, and more particularly to detecting and identifying preselected and/or potential advertisement breaks in a digitized video sequence or file.

BACKGROUND

Traditionally, video content, such as movies, television shows, etc., has been pre-edited to include "advertisement breaks" for subsequent insertion of advertisements into the content by broadcasters. As referred to herein, an "advertisement break" or "ad break" is an identified point, range of timecodes, or range of frames within a video file or sequence for inserting an advertisement. These ad breaks typically comprise blacked-out portions of the video content, indicating to a broadcaster an appropriate location for including an advertisement or group of advertisements. Some ad breaks are short (e.g., ¾ of a second) and merely indicate an insertion point at which an ad can be spliced into the video. Other ad breaks, however, are longer (possibly several minutes or more), thereby requiring several ads to be recorded or played over the ad break.

Historically, a video program signal would be embedded with "cue tones" identifying the advertisement breaks in the respective video. Generally, a cue tone comprises a dual-tone multi-frequency (DTMF) type of tone used as a method of in-band signaling by cable television broadcasters to indicate start and stop times of local commercial or advertisement insertion points. Thus, when broadcasting a traditional form of video content, such as a television program, broadcasters were able to detect the cue tones in the program signal and insert advertisements accordingly. Depending on the specific signal, broadcaster, or recorded video content, the cue tone could be a short tone, indicating the beginning and/or end of a break, or it could be a longer tone that lasted throughout an entire break.

With the transition into the "digital age", more and more forms of multimedia content are being digitized and subsequently viewed or played via the Internet, on a mobile device (e.g., a cell phone or mobile media player), or via some other digital display device. To comply with digital broadcast requirements, content that was originally recorded in non-digital format requires conversion to a digital file, such as an MPEG-1, MPEG-2, MPEG-4, or other similar type of file. Thus, vast amounts of previously-existing video content have been converted from prior formats into digitized format.

Once videos have been digitized, however, the originally-embedded cue tones that identified the advertisement breaks in the videos are no longer perceptible by a digital video player. Thus, these videos may include several undetectable blacked out portions corresponding to pre-inserted ad breaks. When a video containing such advertisement breaks is displayed to a viewer, the viewer is forced to watch or manually fast forward through each ad break. Accordingly, it is desirable to locate the ad breaks in the video so that they can be extracted from the video or automatically skipped during video broadcasting, thereby enabling uninterrupted playing of the video (i.e., no blacked-out portions). Further, it is beneficial to digital video publishers to identify these ad breaks so that advertisements can be included at appropriate locations in the video during a digital broadcast (i.e., so that the ad breaks in digital videos can be used for their originally-intended purpose—inserting and presenting commercials or advertisements).

In addition to identifying pre-inserted ad breaks in digitized videos, some broadcasters or video content users wish to identify other potential ad breaks not originally identified. Historically, ad breaks were inserted during the cut, or change, from one scene to another as chosen during assemblage of the video sequence. However, some video content publishers wish to include advertisements in non-traditional locations of the video, ineffective of a scene change. For example, within a given scene in a video there may be camera shot changes or other transitions in which it may be appropriate to insert an advertisement. Determination of additional and/or different ad locations within the video sequence removes restraint on the placement of advertisements so that they are no longer bound by broadcast norms. Accordingly, identification of these locations in a video file would be advantageous for many video content users.

For these and many other reasons, there is a continuing need for a system or method that identifies or detects pre-inserted or preselected advertisement breaks in digital video files or sequences for manipulation or removal of those advertisement breaks for video viewing purposes. There is a further need for a system or method that identifies other, non-preselected locations in videos that may be appropriate for insertion of advertisements.

BRIEF SUMMARY OF THE DISCLOSURE

Briefly described, and according to one embodiment, the present disclosure is directed to a system for identifying advertisement breaks in digital video files. Generally, the system comprises a video database for storing digital video files, and an advertisement break identification module operatively coupled to the video database that is capable of executing a plurality of computer-implemented functions or steps. In one embodiment, the steps include retrieving a digital video file from the video database (wherein the digital video file comprises a plurality of frames), and generating an edge response for frames in the plurality of frames until a particular edge response for a particular frame is less than a predefined edge response threshold. The particular frame is then identified as the first frame in an advertisement break. The module then generates an edge response for frames subsequent to the first frame in the advertisement break until a particular subsequent edge response for a particular subsequent frame is greater than the predefined edge response threshold. The particular subsequent frame is then identified as the last frame in the identified advertisement break. Typically, data associated with the first frame and the last frame in the identified advertisement break is then stored in the video database in association with the retrieved digital video file.

According to one aspect, the advertisement break identification module is further capable of executing the steps of extracting an audio signal from the digital video file corresponding to the identified advertisement break, performing a Fourier transform on the extracted audio signal to produce a plurality of frequency values, and calculating an average frequency value from the plurality of frequency values. If the average frequency value is outside of a predetermined audio frequency range, then the identified advertisement break is verified as a valid advertisement break.

According to an additional aspect, the advertisement break identification module is capable of further executing the step of verifying that edge responses for each of a preselected number of frames subsequent to the particular frame are less than the predefined edge response threshold before identifying the particular frame as a first frame in an identified advertisement break. The module is also capable of executing the step of verifying that edge responses for each of a preselected number of frames subsequent to the particular subsequent frame are greater than the predefined edge response threshold before identifying the particular subsequent frame as a last frame in the identified advertisement break.

According to another aspect, the advertisement break identification module is capable of further executing the step of associating metadata with the first frame and the last frame of the identified advertisement break in the digital video file. In one aspect, the metadata provides an instruction to a digital video player to skip past the identified advertisement break during display of the digital video file to a viewer. In an alternate aspect, the metadata provides an instruction to a digital video player to retrieve an advertisement for display during the identified advertisement break during display of the digital video file to a viewer.

According to a further aspect, the identified advertisement break comprises all frames of the digital video file between the identified first frame and last frame. In one aspect, the advertisement break identification module is capable of executing the step of removing the advertisement break from the digital video file.

According to yet another aspect, the generated edge response for each frame is generated via a Canny edge detection algorithm. In one aspect, the generated edge response for each frame comprises the number of pixels associated with edge features in each frame.

According to yet another aspect, the data associated with the first frame and the last frame in the identified advertisement break comprises frame numbers of the respective frames. In an alternate aspect, the data associated with the first frame and the last frame in the identified advertisement break comprises time codes of the respective frames.

According to an additional embodiment, the present disclosure is directed to a method for identifying an advertisement break in a digital video file. Generally, the method comprises the steps of receiving a digital video file (the digital video file comprising a plurality of frames), and generating an edge response for frames in the plurality of frames until a particular edge response for a particular frame is less than a predefined edge response threshold. The particular frame is then identified as the first frame in an advertisement break. The method then comprises generating an edge response for frames subsequent to the first frame in the advertisement break until a particular subsequent edge response for a particular subsequent frame is greater than the predefined edge response threshold. The particular subsequent frame is then identified as the last frame in the identified advertisement break. Typically, data associated with the first frame and the last frame in the identified advertisement break is then stored in association with the digital video file. In one embodiment, the stored data associated with the first frame and the last frame in the identified advertisement break is used for manipulation of the digital video file when the digital video file is subsequently displayed to a viewer.

According to one aspect, the method further comprises the steps of extracting an audio signal from the digital video file corresponding to the identified advertisement break, performing a Fourier transform on the extracted audio signal to produce a plurality of frequency values, and calculating an average frequency value from the plurality of frequency values. If the average frequency value is outside of a predetermined audio frequency range, then the identified advertisement break is verified as a valid advertisement break.

According to an additional aspect, the method further comprises the step of verifying that edge responses for each of a preselected number of frames subsequent to the particular frame are less than the predefined edge response threshold before identifying the particular frame as a first frame in an advertisement break. In one embodiment, the method further comprises the step of verifying that edge responses for each of a preselected number of frames subsequent to the particular subsequent frame are greater than the predefined edge response threshold before identifying the particular subsequent frame as a last frame in the identified advertisement break.

According to another aspect, the stored data associated with the first frame and the last frame of the identified advertisement break comprises metadata. In one aspect, the manipulation of the digital video file comprises automatically skipping past the identified advertisement break during display of the digital video file to the viewer. In another aspect, the manipulation of the digital video file comprises retrieving an advertisement for display during the identified advertisement break during display of the digital video file to the viewer.

According to still another embodiment, the present disclosure is directed to a method (implemented in a computer network) for identifying an advertisement break in a digital video file. The method comprises the steps of receiving a digital video file (the digital video file comprising a plurality of frames), extracting a selected subset of frames from the plurality of frames in the digital video file, and calculating an edge response for each frame in the selected subset of extracted frames. Upon a determination that the edge response for a particular frame in the selected subset of extracted frames is less than a predetermined edge response threshold, the method identifies the particular frame as an advertisement break start frame. Further, upon a determination that the edge response for a frame subsequent to the particular frame in the selected subset of extracted frames is greater than the predetermined edge response threshold, the method identifies the subsequent frame as an advertisement break stop frame. Once the advertisement break start and stop frames are identified, metadata indicative of an identified advertisement break is associated with the advertisement break start frame and advertisement break stop frame in the digital video file.

According to one aspect, the metadata provides an instruction to a digital video player to automatically skip from the advertisement break start frame to the advertisement break stop frame during display of the digital video file to a viewer.

According to an additional aspect, the identified advertisement break comprises all frames of the digital video file located between the advertisement break start frame and the advertisement break stop frame. In one aspect, the method further comprises the step of deleting all frames associated with the identified advertisement break from the digital video file.

According to one particular aspect, the selected subset of frames includes each frame in the digital video file.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF PREFERRED EMBODIMENTS

Figure 1:
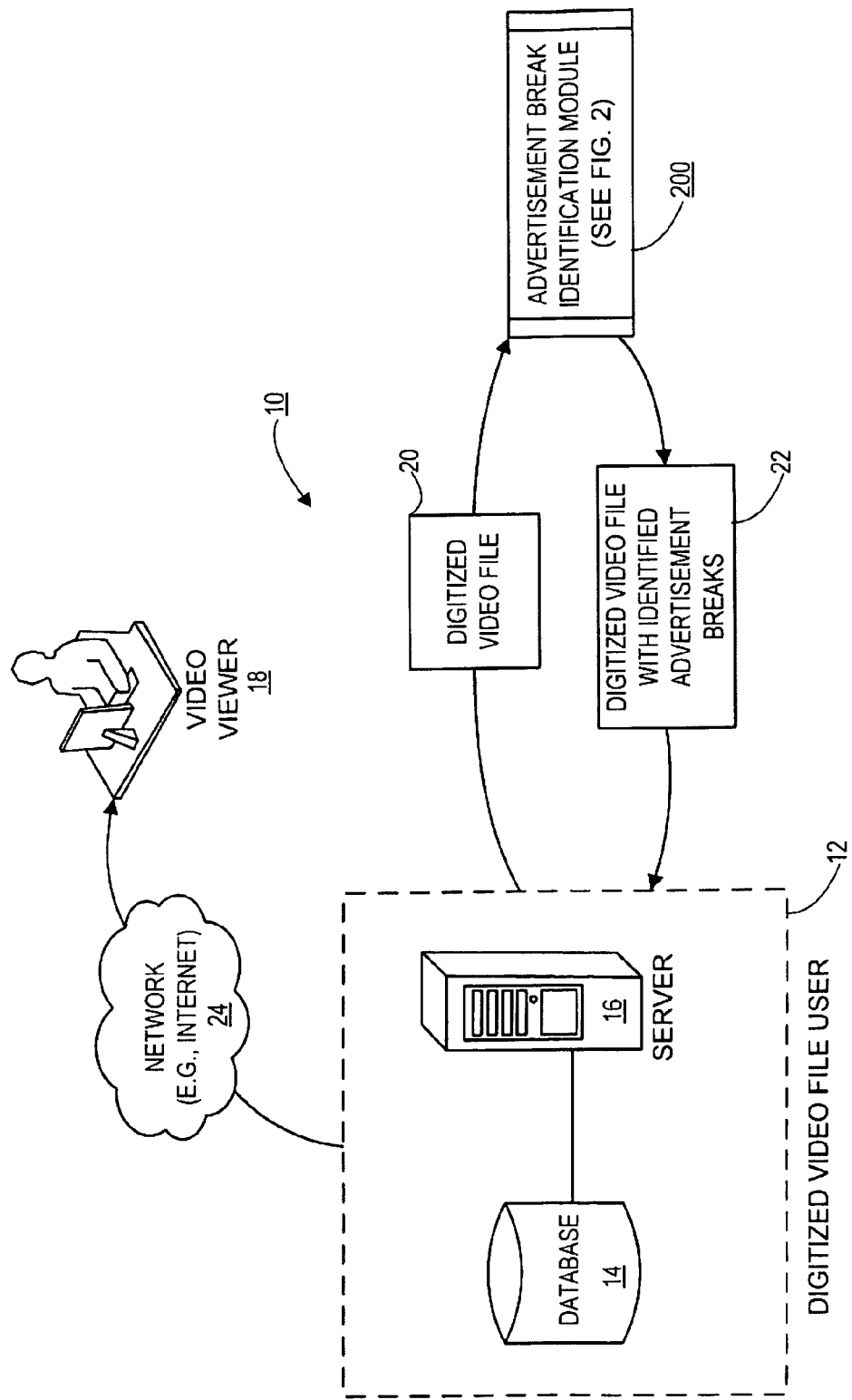
FIG. 1 illustrates the system architecture according to one embodiment of the present advertisement break identification system.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Aspects of the present disclosure generally relate to systems and methods for identifying pre-inserted and/or potential advertisement breaks in digital video files or sequences. As described previously, detecting or identifying ad breaks in video files enables removal or manipulation of the breaks for a plurality of video viewing purposes, such as inserting advertisements into video files, extracting blacked out portions of videos associated with identified ad breaks, or embedding video files with metadata that instructs a digital video player to automatically skip past unused ad breaks when the video files are played via the player.

Generally, aspects of the present systems and methods perform a frame-by-frame analysis on each received video file. As referred to herein, a "video file" or "digital video file" comprises an electronic file including a sequence of frames associated with a movie, television program, music video, home-recorded video, or any other similar type of content (or portion thereof). Each frame (or a selected portion of the frames) of a given file is extracted and analyzed to identify the particular frame content. A form of feature extraction, such as edge analysis via the Canny edge detector (described in greater detail below), is used to determine the content associated with each frame. Typically, "edges" characterize boundaries between various content in an image. For example, different images in a frame, such as an image of an object, a setting, an actor, a face, etc., all have "edges" that indicate the general shape(s) of the image content in the frame. As used herein, an "edge" refers to an area, pixel, or group of pixels in a frame with a strong intensity contrast—a jump in intensity from one pixel or group of pixels to the next. Essentially, an edge identifies the outline or structure of the content in an image (see FIG. 5, discussed in greater detail below, for an exemplary frame showing identified edge pixels).

As mentioned previously, ad breaks are generally associated with black screens or frames. Thus, it is assumed that frames with little or no edge content include little or no image variation, and therefore comprise black frames that may correspond to a predefined ad break. Once a frame has been identified as having a low edge response (i.e., low intensity or low number of edge pixels), the frame is compared to subsequent frames to determine the number of frames in a sequence that similarly have low edge responses (i.e., duration of potential ad break). Further, comparing an identified low intensity frame to subsequent frames ensures that the identified frame is not an anomaly (e.g., a camera shot change or a random black frame accidentally inserted into a video sequence). According to some aspects, time thresholds are used to distinguish preselected advertisement breaks from other low edge response screens, such as camera shot changes or transitions. If a series of frames satisfies a particular frame edge value threshold, as well as a time threshold, then the series of frames are identified as a potential ad break.

According to one embodiment, once an ad break is identified for a given video, the audio portion of the video file associated with the identified ad break is analyzed to verify the existence of the ad break. In one aspect, a Fast Fourier Transform (FFT) is performed on the audio components associated with the identified frames, and the average power of the audio is measured across the frequency spectrum. If the average power is below a predetermined power threshold value, then the ad break is verified as a valid, pre-inserted ad break. Essentially, the audio verification process is utilized to ensure that no dialogue is present in the identified, potential ad break of the video (e.g., a night scene in a movie may have little or no edge response, but is not an advertisement break).

Once a series of frames has been identified (and optionally verified) as an ad break, the identified frames, time codes, or other identifiers are stored in a database for subsequent use. Preferably, the identified time codes or frames are associated with metadata that enables manipulation of the video file. For example, the time codes associated with the beginning and end of an ad break can be associated with metadata that instructs a digital video player to skip past the identified ad break portion of the video when the video is being displayed. Or, the metadata can be used to retrieve an advertisement to be displayed during that portion of the video. As will be understood, identification of ad breaks in digital videos enables a variety of subsequent capabilities.

Referring now to FIG. 1, an embodiment of the advertisement break identification system 10 is shown. As shown, the system 10 includes a digitized video file user 12 and an advertisement break identification module 200. Generally, the digitized video file user 12 comprises an entity that has a use for digitized video content with identified advertisement breaks, such as an Internet content publisher, digital video broadcaster, movie or television production company, advertisement agency, online video warehouse (and licensor), or other similar entity that uses digitized video files. In the embodiment shown, the video file user 12 broadcasts digitized video content to a video viewer 18 over a network (e.g., the Internet) 24. According to one embodiment, the advertisement break identification module 200 comprises a third party component external to the digitized video file user system 12 and operated independently and separately from the digitized video file user network. According to another embodiment, the advertisement break identification module comprises a component internal to the digitized video file user's network.

As will be understood and appreciated by one of ordinary skill in the art, and as shown in FIG. 1, embodiments of the advertisement break identification system 10 comprise computer systems including databases 14 and other storage apparatuses, servers 16, computer modules 200, and other components (not specifically shown), such as processors, interfaces, computer-readable media, memories, communications buses, algorithms, terminals and displays, and other computer-related components. The computer systems are specially configured and adapted to perform the functions and processes of the present system, specifically, detecting and identifying advertisement breaks in videos as described herein (i.e., they are particular machines). Further, any results or outputs relating to identification of ad breaks in video files may be stored in a database 14, associated as metadata with analyzed video files, output as an electronic or printed report, displayed on a computer terminal, or otherwise delivered to a system operator or user for analysis, review, and/or further processing. Additionally, as will be understood, although the embodiment of the system shown in FIG. 1 includes only one of each of a server 16, a database 14, and an advertisement break identification module 200, other embodiments of the present system include a plurality of each of these components as needed.

In the embodiment shown in FIG. 1, digitized video files 20 are stored in database 14 for subsequent use. The initiate the advertisement identification process described herein, a given video file 20 is retrieved from the database 14 by the server 16 and transmitted to the advertisement break identification module 200 for analysis and identification of potential ad breaks. According to one embodiment, rather than being retrieved from the database, a video file is received from an external component (not shown) and analyzed by the identification module 200 accordingly. Typically, the digital video file includes a plurality of frames comprising a plurality of images that together make up the video file. As mentioned previously, the digital file typically has been digitized from an earlier-recorded format into a digital format.

Upon receipt by the advertisement break identification module 200, the video file 20 is analyzed to identify pre-inserted and/or potential ad breaks in the file. Generally, frames are extracted from the video file and processed via a form of feature extraction to identify black or dark frames (i.e., those frames potentially associated with advertisement breaks). As will be understood and appreciated by those of ordinary skill in the art, a "feature" in this context refers to an individual, measurable heuristic property of an image used for a variety of purposes, such as pattern or object recognition, image classification, detecting various types image content, etc. Essentially, features are data extracted from an image region and used to characterize its appearance. In a preferred embodiment, edge analysis is performed to extract edge features from each processed frame in the digitized video file 20. Edge features are generally preferred for detecting black or dark frames, as they produce black and white pixel values from an image, thereby eliminating variance in pixel values across the grayscale and enabling more efficient processing. As will be understood, however, other methods for detecting black frames may be used, such as training an intensity classifier to detect and classify "dark" frames.

If edge analysis is used, the preferred edge detection method comprises utilizing a Canny edge detection algorithm to identify edge content in an image, which is discussed in detail in Canny, J. F., *A Computational Approach to Edge Defection*, IEEE Trans. Pattern Analysis and Machine Intelligence, 8:679-714 (1986), which is incorporated herein by reference as if set forth herein in its entirety. The Canny edge detector focuses on three main goals—good edge detection, good edge localization, and minimal response. "Good detection" means that the algorithm should mark as many "real" edges as possible as are present in a given image. "Good localization" means that the distances between the edge pixels as found by the detector and the actual edge in the image should be at a minimum. "Minimal response" means that a given edge in an image should be marked only once (i.e., only one response per edge), and where possible, image noise should be eliminated so as not to create false edges. As one of ordinary skill in the art will appreciate, other edge detectors may be used according to various embodiments of the present system, but the Canny edge detector is preferred.

Still referring to FIG. 1, once the edge content for a given frame in the digital video file 20 has been generated, the number of edge pixels associated with the frame is calculated. As mentioned previously, a low number of edge pixels generally suggests low image variance or contrast in the frame, thereby indicating a dark or black frame. If the number of edge pixels for a frame is below a predefined edge value threshold, the frame is identified as the start of a potential advertisement break. Subsequent frames are then analyzed in the same manner as the first, and if they similarly have edge pixel values below the predefined threshold, they are associated with the first frame as a potential ad break. Once a frame is detected that produces a number of edge pixels above the predefined threshold, the frame is identified as the end of the potential advertisement break. According to one embodiment, in addition to an edge value threshold, one or more time thresholds are also used, whereby edge pixel values must remain below or above the predefined edge threshold value for a certain number of frames in a series (i.e., for a set period of time) in order for the frames to be associated with an advertisement break start time or stop time, respectively. After the frames in the digital video file 20 have been analyzed, the frames associated with detected ad break start and stop times are grouped to identify sequences of frames that comprise potential advertisement breaks in the video file.

Figure 7:
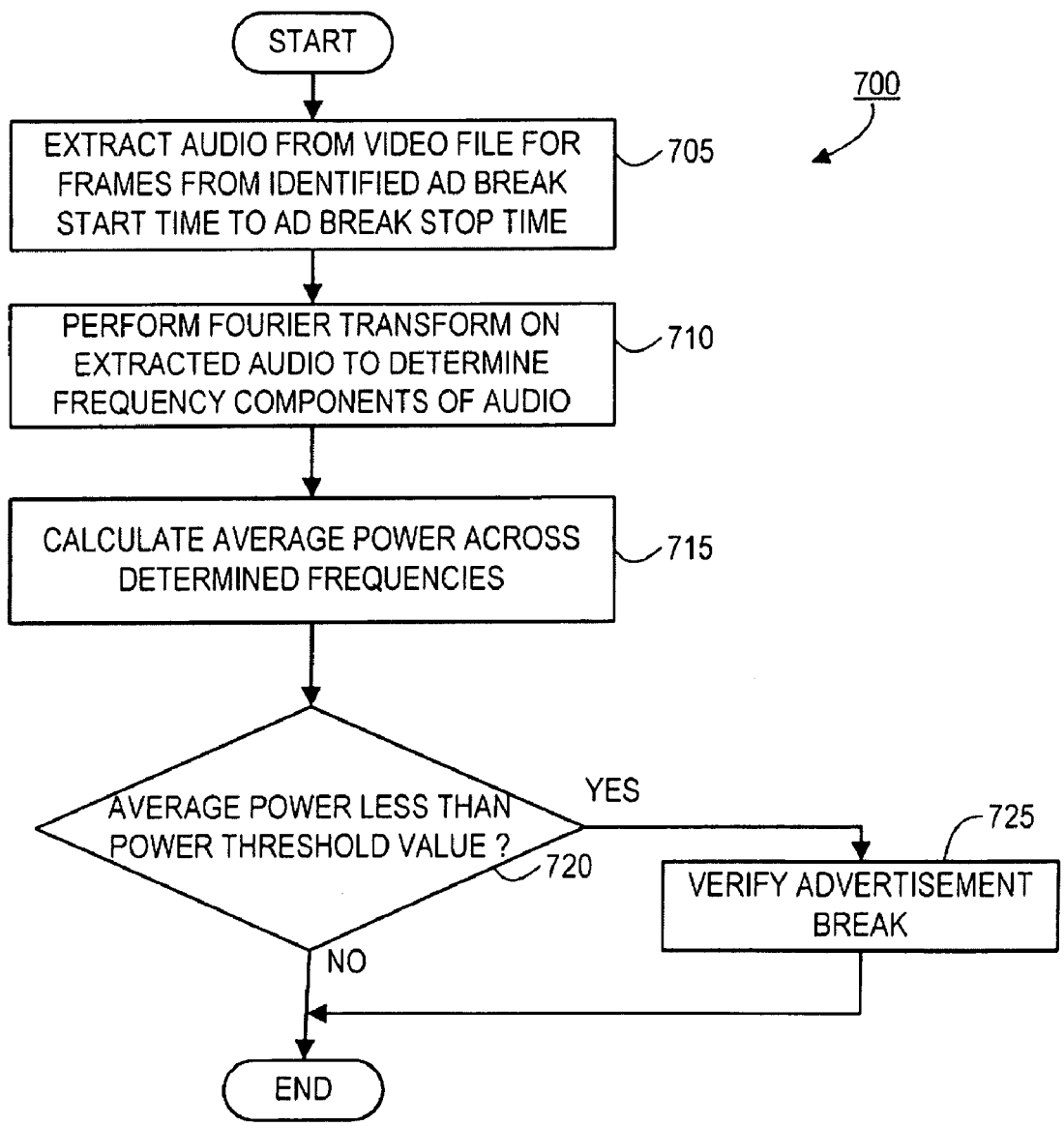
FIG. 7 is a flowchart illustrating the steps associated with one embodiment of the audio verification process.

Additionally, in some embodiments, an audio verification process is utilized on the identified ad break frame sequences to verify that the identified sequences of frames are in fact pre-inserted ad breaks (or sufficient for use as potential new ad breaks). The audio verification process, discussed in greater detail below in associated with FIG. 7, is used to detect any dialogue in the portions of the video file associated with the identified frames. Further, according to one embodiment, a sequence of identified frames must satisfy an additional time threshold to be deemed a valid advertisement break. For example, a digitized video file user 12 or other system operator may define a minimum advertisement break time of at least ¾ of a second in duration. Thus, if the identified frames for a given, potential ad break only represent a portion of the video file 20 that is ½ of a second in duration, then the ad break is rejected (even though it may have satisfied the pixel value threshold and audio verification process). In other embodiments, all advertisement breaks are identified, regardless of duration or total number of frames. As will be understood, a video rile user 12 or other system operator is able to predefine various thresholds and parameters as desired to produce varying results.

Still referring to FIG. 1, after the video file 20 has been processed by the advertisement break identification module 200, the digitized video file with identified advertisement breaks 22 is thereby returned to the digitized video file user 12, where it is made available to viewers 18, or stored in the content database 14 for subsequent use, or otherwise processed. In one embodiment, the ad break identification module 200 is operatively coupled to the database 14 for storing generated or identified data during various stages of the advertisement break identification process.

According to various embodiments, the advertisement breaks in the digitized video file with identified ad breaks 22 are extracted from the file, or the file is tagged with metadata identifying the advertisement breaks, or is labeled in some way such that the user 12 can use the identified ad breaks as desired. In one embodiment, if the identified advertisement breaks are extracted from the file, then a predetermined number of frames associated with the ad break are allowed to remain in the file to create a natural transition between video content occurring before and after the ad break (i.e., a few black frames are left in the file). In a preferred embodiment, rather than extracting advertisement break frames from the video file, the identified time codes or frames associated with the advertisement breaks are associated with metadata that enables manipulation of the video file. Such video file manipulation includes enabling a video player (typically being watched by a video viewer 18) to automatically skip past pre-inserted advertisement breaks, or retrieve digital commercials for insertion and display during the identified ad breaks, or perform some other similar function (as described previously or as will occur to one of ordinary skill in the art). According to one embodiment, the digitized video file with identified advertisement breaks 22 is transformed and saved as a new file to reflect the deletion of various ad breaks, or the embedding of metadata, etc.

Figure 2:
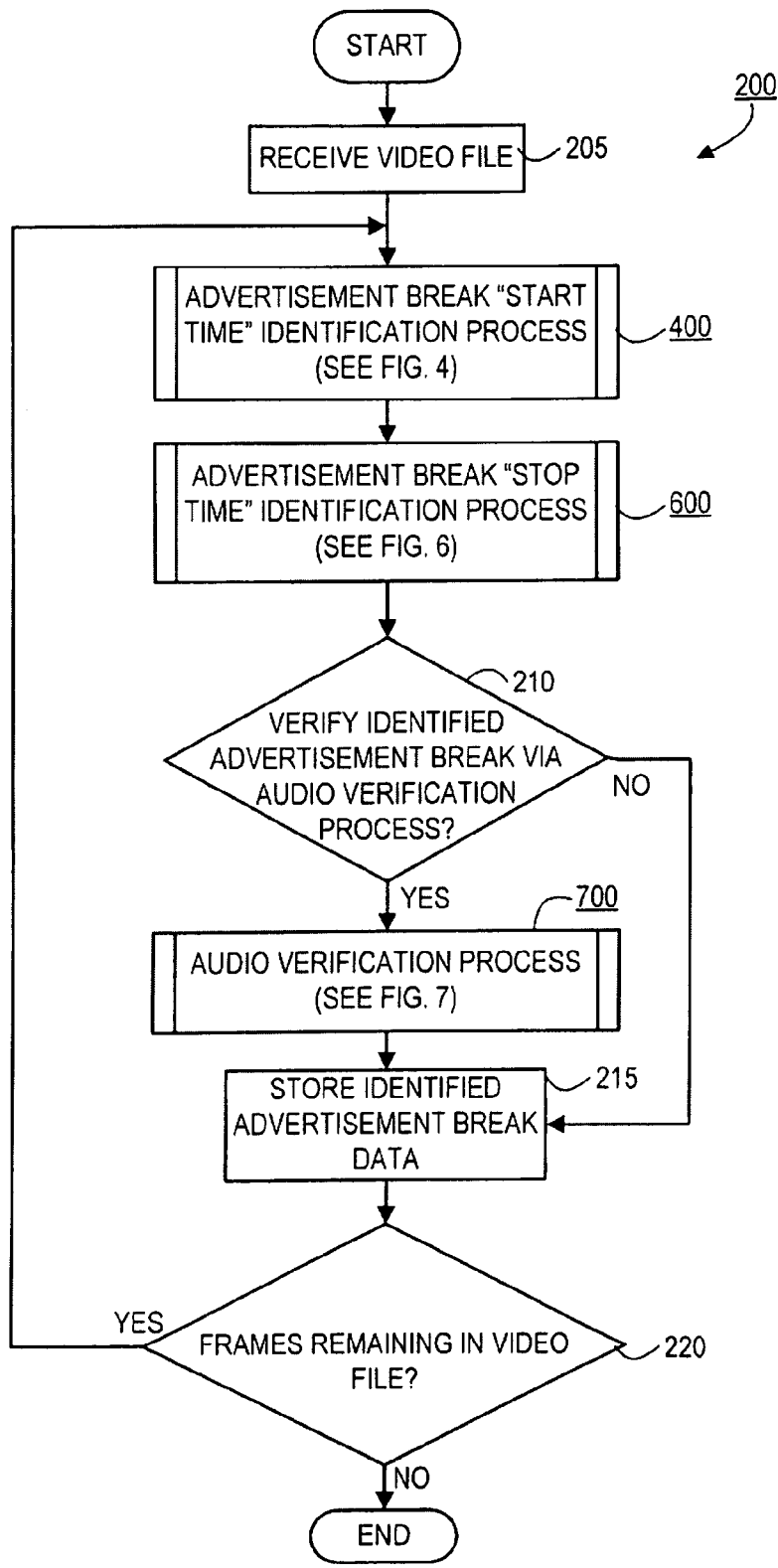
FIG. 2 is a flowchart illustrating the high-level functions of the advertisement break identification process as performed by one embodiment of the advertisement break identification system.

Referring now to FIG. 2, a flowchart is shown illustrating the high-level functions of the advertisement break identification process 200, as performed by one embodiment of the present advertisement break identification system 10. The overall process 200 is described initially in a broad sense in conjunction with FIG. 2, and the details and specific aspects of each component of the system are described in greater detail below. As will be understood and appreciated, the ad break identification process 200 is performed on a looping and continual basis as new digitized video files 20 are received by the system 10.

Figure 3:
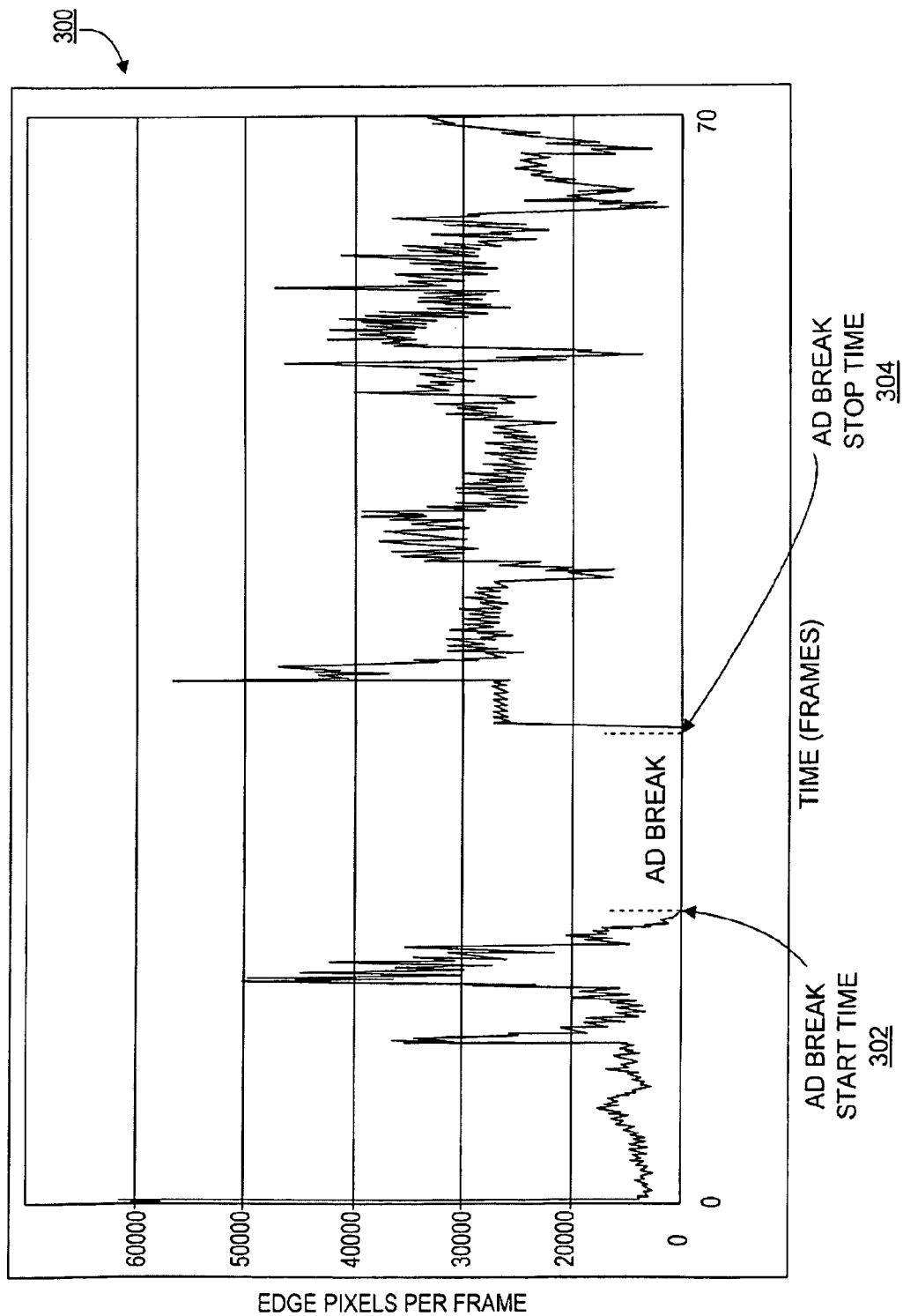
FIG. 3 illustrates an exemplary plot of calculated edge pixels per frame for a given sequence of frames in a digitized video file.

Starting at step 205 in FIG. 2, a video file 20 is received by the advertisement break identification module 200. Once received, the advertisement break "start time" identification process 400 is performed on the received video file (described in greater detail below in association with FIG. 4). The purpose of the "start time" process 400 is to identify the beginning of an advertisement break (either in the form of a time code or frame number) in the video file. Reference is made to FIG. 3, which illustrates an exemplary plot of calculated edge pixels per frame for a given sequence of frames in a digitized video file. The edge pixels per frame indicates the total number of pixels in each frame that are associated with image edges, preferably calculated based on edge analysis of each frame via the Canny edge detector, as described elsewhere herein. As 20 shown, the ad break start time 302 identifies a point at the beginning of a potential ad break in which the edge pixel values for a given frame have dropped below a threshold edge value. As shown, the edge pixel values per frame remain below the threshold (essentially at zero for the example shown in FIG. 3) for a certain number of frames, and then they spike back up. The point immediately prior to the spike in edge pixel values is 25 indicated as an ad break stop time 304, which is identified via the advertisement break "stop time" identification process 600 (described in greater detail below in association with FIG. 6). When plotted, the edge pixel values per frame provide a relatively clear indication of sequences of frames in a video file that may comprise a pre-inserted ad break, or may be adequate to define a new ad break.

It should be understood and appreciated that the ad insert start location 302 can be identified as a time value or as a frame number in the video file. Similarly, the ad insert stop location 304 can also be identified as a time value or as a frame number. According to various embodiments, the start and stop times can be identified as absolute time values (i.e., time codes) within the video file, or alternatively, the start and stop times can be identified relative to some other location or time within the video file. If the start and stop locations are identified by frame numbers, then those frame numbers can likewise comprise absolute frame locations within the video file, or alternatively, may comprise frame numbers relative to some other frame within the video file.

Referring again to FIG. 2, once a potential ad break start time and stop time have been identified via processes 400 and 600, the system determines whether the identified ad break is to be verified via the audio verification process 700 (step 210). As mentioned previously, a system operator or video file user 12 may define the system settings as desired, and may define whether or not identified ad breaks should be verified by analyzing the audio associated with the identified breaks. If the audio verification process is not to be utilized, data associated with the identified advertisement break (e.g., frame numbers or time codes associated with the ad break start and stop times, or all frame numbers or time codes associated with all frames in a given ad break) is stored in a database 14 for subsequent use (step 215). If, however, the audio verification process 700 is to be performed, then the audio portion of the video file associated with the identified advertisement break is extracted and analyzed according to the steps and functions shown and discussed in association with FIG. 7. If the potential ad break is verified as an actual advertisement break based on the audio process 700, then the verified ad break is stored in the database 14 (step 215). If the audio process determines that the ad break contains audio that indicates it is not a valid advertisement break, then the data associated with the ad break is discarded.

After an advertisement break has been verified and stored (step 215), or deemed invalid and discarded, the process 200 determines whether any frames are remaining in the received video file 20 that have not yet been analyzed (step 220). As will be understood, each video file generally includes a plurality of advertisement breaks, and thus all ad breaks in the file should be identified. Thus, if frames are remaining in the video file subsequent to the frames associated with the identified advertisement break, the process 200 is repeated for the frames following the identified ad break, beginning with the start time identification process 400. If, however, the video file has been completely analyzed, and no frames are remaining, then the advertisement break identification process is ended. As will be appreciated by one of ordinary skill in the art, if no advertisement breaks are identified for a given video file (i.e., the file includes no pre-inserted ad breaks and no sequences of frames that qualify as potential new ad breaks), then no data is generated and/or stored in the database 14 for the particular file.

Figure 4:
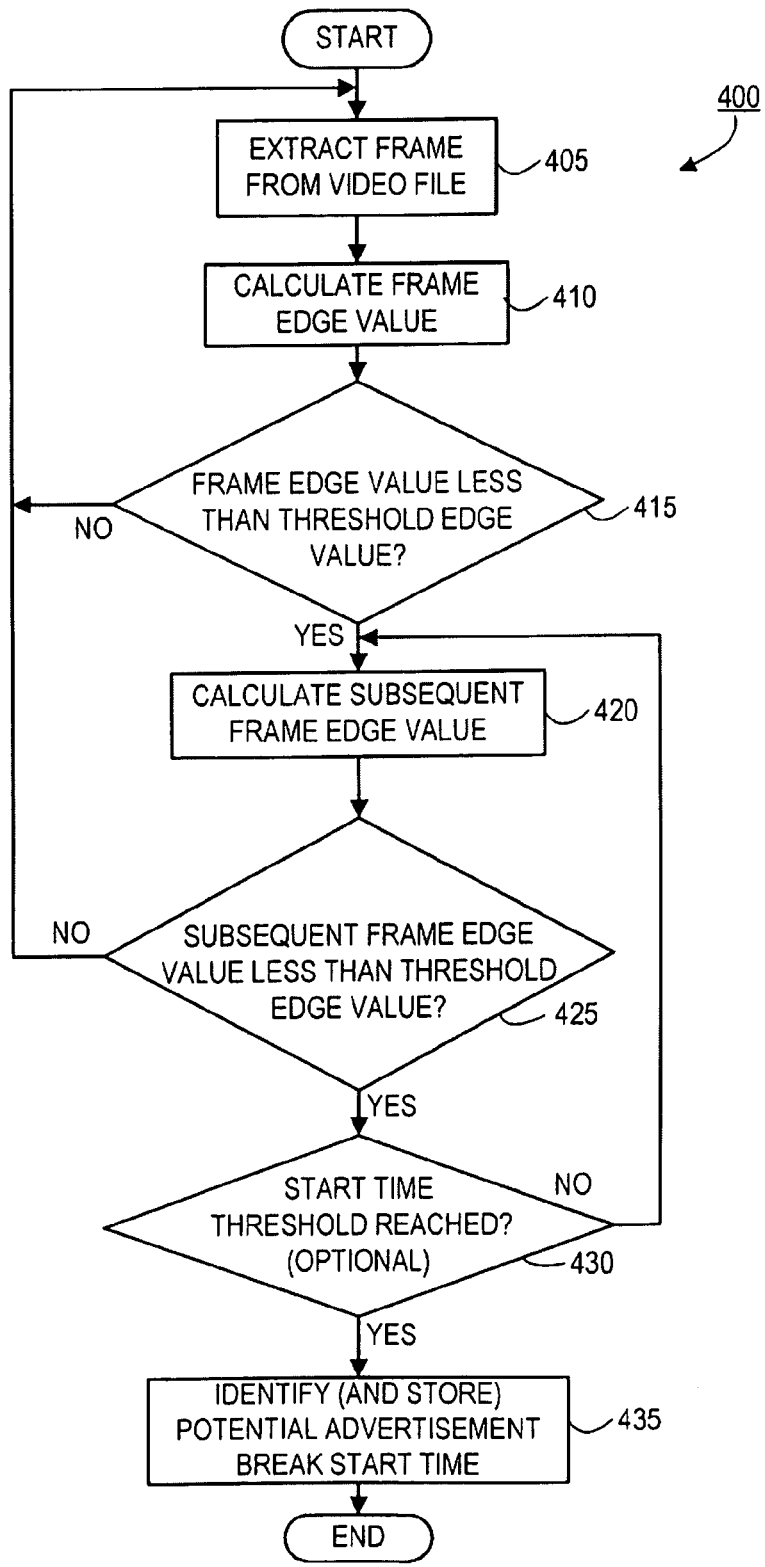
FIG. 4 is a flowchart illustrating the steps associated with one embodiment of the advertisement break "start time" identification process.

FIG. 4 is a flowchart illustrating the steps associated with one embodiment of the advertisement break "start time" identification process 400. As mentioned previously, once the ad break identification module 200 receives a digitized video file 20 to be analyzed, the file is processed via the ad break "start time" process 400 to identify potential starting points associated with ad breaks in the file. Generally, identified advertisement break start times are referred to as "potential" start times until they are deemed valid based on satisfaction of various time thresholds, the audio validation process 700, etc. Starting at step 405, a frame is extracted from the video file. Typically, the first frame extracted from the video file is the first frame in the video file (i.e., the beginning of the video), but this is not necessarily the case (e.g., a video file user 12 may only wish to analyze a certain portion of a video file, or previous ad breaks may have already been identified, etc.). Regardless, after a frame has been extracted, the frame "edge value" or "edge response" is calculated for the extracted frame (step 410). As used herein, the "edge value" or "edge response" refers to the total number of pixels associated with edge content in a given frame (also referred to as the "intensity" of the frame). Preferably, the Canny edge detector is used to determine the edge response for each extracted frame, although other edge analysis algorithms are used according to various embodiments of the present system.

Figure 5:
FIG. 5 shows an exemplary frame extracted from a video file that has been processed via a form of edge analysis, thereby indicating the edges identified for the frame.

Referring to FIG. 5, an exemplary frame 500 is shown that has been processed via a form of edge analysis (e.g., Canny edge detection), thereby indicating the edges identified for the frame. As shown, the edge pixels 505 are illustrated as black pixels, whereas all non-edge pixels are shown as white pixels. In conventional Canny edge analysis, the edge pixels are indicated as white pixels, and the background pixels are shown in black. However, the edge data displayed in FIG. 5 has been inverted (i.e., edge pixels shown in black instead of white) for purposes of this disclosure to assist in ease of viewing of the frame 500. Once the edges have been identified, the total number of edge pixels 505 associated with the edges for the frame are determined. According to one embodiment, a predetermined algorithm calculates the number of edge pixels for each frame based on the identified edges. According to another embodiment, an intensity histogram for each frame is plotted (not shown), and the total number of edge pixels are determined based on the plotted black and white pixel values. The total number of edge pixels for each frame is identified as the edge value or edge response for each frame.

Referring again to FIG. 4, after the edge value has been calculated for the extracted frame, the system determines whether the frame edge value is less than a predefined threshold value (step 415). Generally, an edge response of zero indicates no content variation in a frame, likely indicating a completely black frame. However, because many digitized video files 20 are digitized from older films or television shows, even black frames associated with advertisement breaks produce some level of edge response due to "noise" in the frame. Or, even if no noise is present, particular frames may include pixelation resulting from the digitization process, thereby creating an edge response. Thus, a threshold edge value is generally used (as opposed to an edge value of zero) to account for such noise. As will be understood, the threshold edge value may comprise a specific number of edge pixels, or may be defined as a percentage of edge pixels compared to background pixels. As will also be understood, because the total number of pixels in a given frame (i.e., both edge and non-edge pixels) can vary based on the quality of the particular video file, the threshold may require adjustment for each separate video file. As will be appreciated, higher threshold values will allow for identification of frames with more image content as potential ad break start frames, thus ensuring that no potential advertisement breaks are missed. Alternatively, lower threshold values will reduce false positives, but may miss some potential ad breaks. Generally, the edge threshold value is predefined by a digitized video file user 12 or a system operator as desired based on the user or operator's specific preferences.

If, based on step 415, the edge value for the extracted frame is not less than the predefined threshold value, then it is assumed that the frame includes at least a minimal amount of image content, and is thereby not part of an advertisement break. Accordingly, the process 400 returns to step 405, and the next frame (or a subsequent frame) in the video file is extracted and analyzed. If, however, the frame edge value is less than the threshold edge value, then the system recognizes that the frame may comprise the start of an advertisement break.

According to one embodiment, the identified frame is identified and stored as a potential advertisement break start time. Preferably, however, subsequent frames are analyzed before identifying the low edge value frame as an ad break start frame to ensure that the low edge value frame is not an anomaly. For example, during original editing of the video file, a black frame may have been inserted during a crop of the video. Thus, although the frame may have a low edge response, it is not associated with an ad break. Accordingly, at step 420, the system calculates the frame edge value for a subsequent frame following the identified low edge value frame. The primary purpose for analyzing subsequent frames is to determine if a series of frames have low edge responses, or if the initially-identified low edge response frame was an anomaly. If the frame edge value for the subsequent frame is greater than the edge threshold value (step 425), then it is assumed that the initially-identified low edge response frame is an anomaly, and the process 400 returns to step 405 for extraction and analysis of the next or subsequent frame in the video file. If, however, the edge value for the subsequent frame is less than the threshold value, then the analyzed frames are assumed to comprise a series of frames of low edge values (i.e., potentially part of an advertisement break), and the process 400 proceeds to optional step 430.

According to one embodiment, the subsequent frame analyzed during step 420 comprises the next frame in the video file immediately following the initially-identified frame. According to other embodiments, however, the subsequent frame is not the next frame in the video file, but some other frame subsequent to the initially-identified frame. For example, due to the large volume of frames associated with some video files, a video file user 12 or system operator may wish to only analyze some predetermined interval of frames (e.g., every third frame, or fifth frame, etc.) to reduce processing times and/or computational memory required. Thus, if such an interval is defined, the subsequent frame analyzed at step 420 comprises the next frame in the predetermined interval.

Still referring to FIG. 4, at step 430, the system determines whether a start time threshold has been reached. According to one embodiment, although two frames have been identified as low edge response frames in steps 410 and 420, respectively, a system operator may wish to analyze further frames before declaring a potential ad break start time. For example, it is possible that a short camera transition in the video file may include a few black frames, but may not correspond to a valid advertisement break. Thus, a system operator or video file user 12 may define a start time threshold (or frame threshold) that calculates frame edge values for further subsequent frames until a certain, predetermined number of frames (or video time span) are identified as low edge value frames. Thus, if a time threshold is defined, and the identified low edge value frames have not yet reached the time threshold, then steps 420, 425, and 430 are repeated until the time value threshold is reached. If, during the repetition of steps 420, 425, and 430, a frame edge value for a subsequent frame is greater than the threshold edge value, then the frames are deemed not part of a valid ad break, and the process again returns to step 405. As mentioned, the start time threshold step 430 is optional, and thus some embodiments bypass this analysis.

Once the start time threshold is reached at step 430 (assuming such a time threshold has been predefined), then the initially-identified frame (from step 410) is identified as a potential start time for an ad break, and data associated with the frame (such as the frame number or time code) is stored for subsequent use (step 435). Preferably, the frame data is stored in a localized memory, but it may also be stored in a database 14 if desired. After the potential advertisement break start time (or frame) has been identified and stored, the process 400 ends, and the advertisement break "stop time" identification process 600 is initiated.

Figure 6:
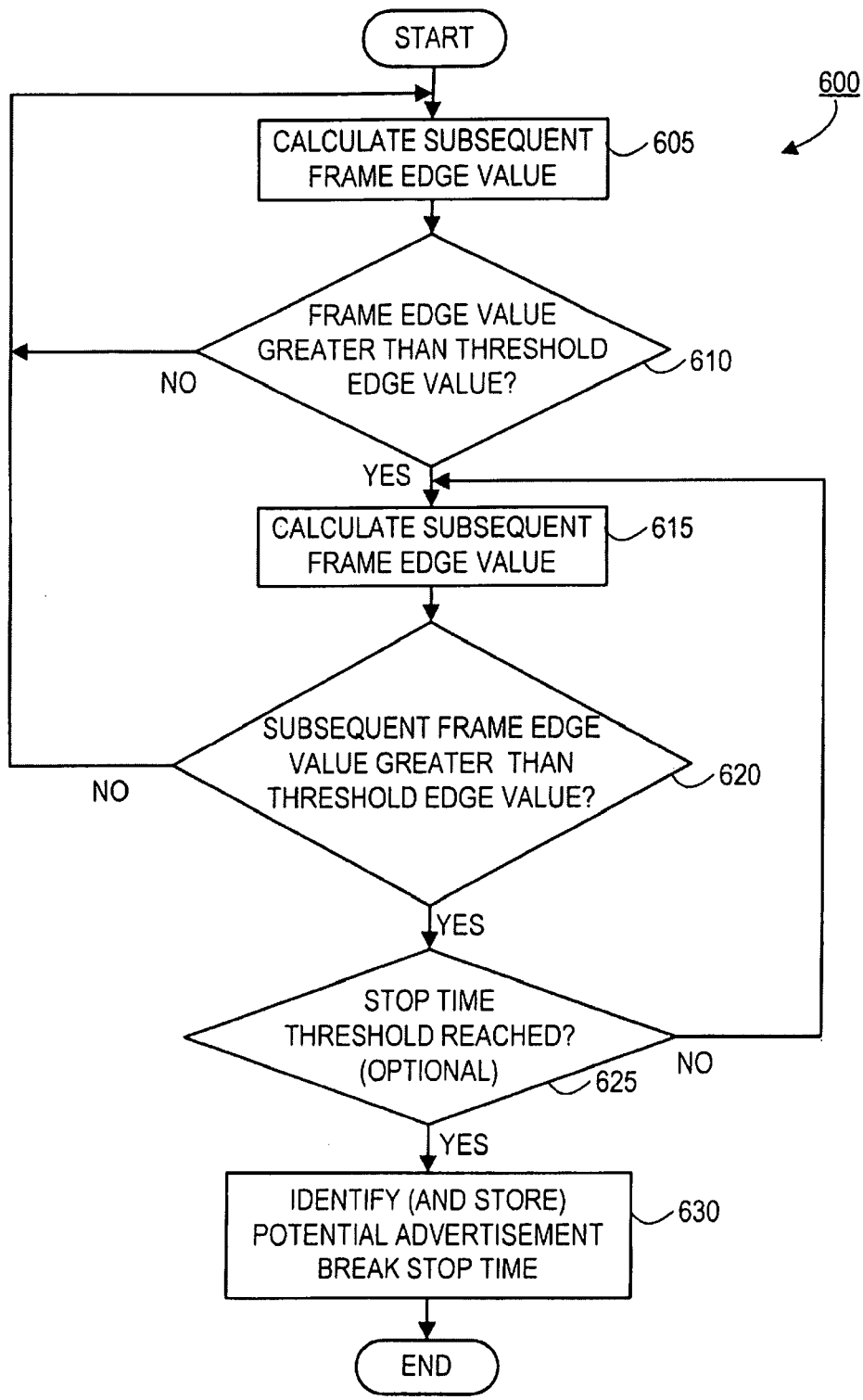
FIG. 6 is a flowchart illustrating the steps associated with one embodiment of the advertisement break "stop time" identification process.

FIG. 6 is a flowchart illustrating the steps associated with one embodiment of the advertisement break "stop time" identification process 600. As will be understood (and as shown previously with respect to FIG. 2), the advertisement break stop time identification process 600 is initiated immediately after the ad break start time identification process 400 has ended. Thus, the frame analyzed at step 605 comprises the next frame (or a subsequent frame according to a predefined interval) following the last frame analyzed at step 420 in process 400. The primary goal of the ad break stop time identification process 600 is to identify the ending location, frame, or time code for the advertisement break identified during process 400 (see stop time 304 in FIG. 3 for exemplary stop time). For example, once an ad break start time has been identified, all subsequent frames whose edge responses remain below the predefined edge threshold value are deemed a part of the identified ad break. Thus, process 600 identifies the point at which the identified ad break ends (i.e., when the edge responses rise above the threshold). Accordingly, the steps shown and discussed in association with FIG. 6 are relatively similar to those shown and discussed in association with FIG. 4, except that the steps shown in FIG. 6 are directed to identifying the point at which frame edge responses exceed the predefined edge threshold value.

At step 605 in FIG. 6, a frame edge value is calculated for an extracted frame subsequent to the last frame analyzed at step 420 in FIG. 4 (discussed previously). The frame edge value determined at step 605 is calculated similarly to those previously described in conjunction with FIG. 4 (e.g., via the Canny edge detector). At step 610, the system determines whether the calculated frame edge value is greater than the edge threshold value. According to one embodiment, the edge threshold value used at step 610 is identical to the value used at steps 415 and 425 in FIG. 4. According to an alternate embodiment, however, the edge threshold value used in conjunction with process 600 is different than that used in association with process 400. Regardless, if the calculated frame edge value is not greater than the threshold value, then the frame is assumed to have low edge content, and thus is deemed part of the ad break identified during process 400. Accordingly, the process 600 returns to step 605, and the next (or subsequent) frame from the video file is extracted and analyzed.

As will be understood and appreciated, steps 605 and 610 may be repeated as many times as necessary until a frame is identified as having an edge value greater than the predefined threshold value. As will also be understood, because some advertisement breaks are several minutes in length, and because many video files include 24 frames (or more) per second of video footage, hundreds (if not thousands) of frames may be analyzed during steps 605 and 610 until a frame is identified with an edge value greater than the threshold value. Once a frame is identified via step 610 with an edge value greater than the threshold value, a frame edge value for a subsequent frame is calculated to ensure that the frame identified during step 610 is not an anomaly (step 615). Similarly to random low edge content frames identified during steps 415 and 420 in FIG. 4, a frame that is a part of a valid ad break may register an edge value that is greater than the threshold value (e.g., based on a high quantity of "noise" in the given frame), even though the frame should be classified as part of the ad break. Thus, to ensure that the frame identified at step 610 as having a high edge value is actually the end of an advertisement break, subsequent frames are also analyzed via steps 615, 620, and (optional) 625 (discussed below). According to one embodiment, however, no subsequent frames are analyzed, and the frame identified at step 610 with an edge value greater than the threshold is deemed the end of the ad break (and the process 600 is ended).

If subsequent frames are analyzed according to steps 615, 620, and 625, then the subsequent frames are processed to ensure that their frame edge values are above the threshold edge value, indicating image contrast (and content) in the frames (i.e., non-black frames). This process is similar to that discussed previously in conjunction with steps 420, 425, and 430 in FIG. 4, except that in FIG. 6 the frames are being analyzed to ensure that they have edge responses greater than the threshold (as opposed to less than the threshold). Accordingly, at step 615, the system calculates the frame edge value for a subsequent frame following the identified high edge value frame (identified at step 605). If the frame edge value for the subsequent frame is less than the edge threshold value (step 620), then it is assumed that the initially-identified high edge response frame is an anomaly, and the process 600 returns to step 605 for extraction and analysis of the next or subsequent frame in the video file. If, however, the edge value for the subsequent frame is greater than the threshold value, then the analyzed frames are assumed to comprise the end of the advertisement break, and the process 600 proceeds to optional step 625.

Still referring to FIG. 6, at step 625, the system determines whether a stop time threshold has been reached (similarly to the start time threshold discussed above in association with step 430 in FIG. 4). According to one embodiment, although two frames have been identified as having edge responses greater than the predefined edge value threshold in steps 605 and 615, respectively, a system operator may wish to analyze further frames before declaring a potential ad break stop time (i.e., the end of the ad break). For example, it is possible that several frames in a row may include a high quantity of noise, and thus will register edge values greater than the threshold edge value, even though the frames should be classified as part of the identified ad break. Thus, a system operator or video file user 12 may define a stop time threshold (or frame threshold) that calculates frame edge values for further subsequent frames until a certain, predetermined number of frames (or video time span) are identified as frames with edge values greater than the edge value threshold. Thus, if a time threshold is defined, and the identified high edge value frames have not yet reached the time threshold, then steps 615, 620, and 625 are repeated until the time value threshold is reached. If, during the repetition of steps 615, 620, and 625, a frame edge value for a subsequent frame is less than the threshold edge value, then the frames are deemed to be a part of the identified ad break (i.e., not the end of the ad break), and the process again returns to step 605. As mentioned, the stop time threshold step 625 is optional, and thus some embodiments of the present system bypass this analysis.

Once the stop time threshold is reached at step 625 (assuming such a time threshold has been predefined), then the initially-identified frame (from step 605) is identified as a potential stop time for an ad break, and data associated with the frame (such as the frame number or time code) is stored for subsequent use (step 630). Preferably, the frame data is stored in a localized memory, but it may also be stored in a database 14 if desired. After the potential advertisement break slop time (or frame) has been identified and stored, the process 600 ends.

According to one embodiment of the present system, before the optional audio verification process 700 is initiated, an additional ad break time threshold is calculated and verified for the identified ad break start and stop times. As mentioned previously, some pre-inserted advertisement breaks are merely indicators that signal to a broadcaster than an advertisement may be inserted at a particular location in the video. These short ad breaks are typically approximately ¾ of a second in length (or, approximately 18 frames for conventional videos). Other advertisement breaks are longer, lasting several minutes or more, and were intended to be recorded over with advertisements (instead of having ads spliced in). Thus, if a system operator or video file user 12 wishes to identify only these pre-inserted ad breaks (as opposed to also identifying new or potential ad breaks), then the operator or user can define a minimum ad break time threshold that must be satisfied before an ad break will be recognized. For example, because most pre-inserted ad breaks last, at a minimum, ¾ of a second, the system operator or user is able to require at least a ¾ second differential between the ad break start time and stop time. As will be understood, this optional ad break time threshold may be defined in terms of frames as opposed to time codes, if desired. By setting a minimum time threshold, sequences of black or dark frames (typically associated with scene changes or camera transitions) that are long enough in duration to satisfy previous thresholds defined in processes 400 and 600, but not long enough to satisfy an additional ad break time threshold, are rejected as pre-inserted ad breaks and discarded by the system.

According to an alternate embodiment of the present system, a system operator or digitized video file user 12 may be interested in identifying scene changes, shot transitions, or other dark frames in a video file (for purposes of identifying new ad breaks or for some other purpose, such as marking scene changes for video indexing, etc.) in addition to pre-inserted ad breaks, and thus no ad break time threshold is mandated. Accordingly, all ad breaks are identified, regardless of length or number of frames. In such an embodiment, previous time thresholds defined in processes 400 or 600 may be ignored or removed at the discretion of a system operator or video file user 12.

Referring now to FIG. 7, a flowchart is shown illustrating the steps associated with the audio verification process 700 according to one embodiment of the present system. As mentioned previously, the audio verification process 700 is optional, and operates primarily to verify that identified advertisement breaks are in fact valid ad breaks, and not sequences of dark frames that are part of the video content, such as night scenes, scenes shot in low light, or some other similar type of sequence. Essentially, process 700 is used to detect dialogue or speech in a portion of video identified as a potential ad break. Starting at step 705, the audio content is extracted from the portion of the video file corresponding to the identified advertisement break. A Fourier analysis (specifically, a Fast Fourier Transform (FFT)) is performed on the extracted audio portion of the video file to determine the frequency components of the potential advertisement break (step 710). Generally, when processing audio signals, Fourier analysis is used to isolate individual components of a compound waveform, concentrating them for easier detection. The dominant frequency spectrum for speech (i.e., dialogue) is between approximately 50-150 Hz. Thus, by concentrating the audio signal via an FFT (i.e., transforming the audio signal into a frequency domain representation of the origin al signal), it can be determined whether the extracted audio includes dialogue, music, or some other audio component. Fourier analysis and FFTs are discussed in greater detail in Bochner, S. and Chandrasekharan, K., *Fourier Transforms*, Princeton University Press (1949); and Bracewell, R. N., *The Fourier Transform and Its Applications*, Boston: McGraw-Hill (2000 3d. Ed.), both of which are incorporated herein by reference as if set forth herein in their entireties.

At step 715, the average power is calculated across the frequency spectrum for the analyzed audio. According to one embodiment, the power is calculated by mean-squared spectrum (which is intended for discrete spectra, generally from periodic, discrete-time signals). Specifically, the peaks in the mean-squared spectrum reflect the power of the signal at a given frequency. According to an alternate embodiment, power spectral density is used, in which the power is reflected as the area in a frequency band. Regardless of the method used for calculating power, if the average power is less than a predefined power threshold value, then it is assumed that any extracted audio merely comprises background noise (i.e., not dialogue), and the identified advertisement break is verified as a valid ad break (steps 720 and 725). If, however, the average power is greater than a threshold value, then it is assumed that the extracted audio does include some significant audio components, and thus the identified ad break is either discarded (i.e., not verified) or marked for subsequent, manual review by a system operator or video file user 12 to determine if the identified ad break is in fact an ad break, or some other sequence of frames (e.g., a night scene).

According to one embodiment, the average power calculated during step 715 is calculated at some predetermined interval (e.g., once per second of the ad break, or once every 24 frames, etc.), and plotted across the entire length of the ad break to provide a graphical representation of the audio components of the ad break (not shown). Further, if such a plot is created, some identified ad breaks indicate high power levels at the beginning of the ad break that trickle off as the ad break progresses. An initial elevated average power that trickles off indicates an ad break in which music or dialogue was playing as the ad break began, but was trailed off or faded out as the ad break progressed.

If an identified advertisement break is verified according to the audio verification process 700, then the ad break is deemed a valid ad break, and data associated with the ad break (e.g., start and stop times or frame numbers, duration of ad break, all frames associated with an identified ad break, etc.) is stored in database 14 for subsequent use by the digitized video file user 12. Additionally, as discussed previously in conjunction with FIG. 2, after an ad break has been identified and verified in a given video file 20, the remaining frames in the file are analyzed to identify additional advertisement breaks. As mentioned previously, many video files include a plurality of advertisement breaks. As also mentioned previously, the identified ad breaks may be used for a variety of purposes, such as associating metadata content with the ad breaks in the video files to enable manipulation of the video files by a digital video file player (e.g., skipping past identified ad breaks during broadcasting of the video file or retrieving and inserting advertisements during the ad breaks), or extraction of the ad breaks from the video file, or some other similar purpose as will occur to one of ordinary skill in the art.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system for identifying advertisement breaks in digital video files, comprising:
    a video database for storing digital video files; and
    an advertisement break identification module operatively coupled to the video database that executes the computer-implemented steps of:
        retrieving a digital video file form the video database, the digital video file comprising a plurality of frames;
        generating an edge response comprising calculating the total number of edge pixels associated with an edge of a frame for frames in the plurality of frames comparing the edge response against a predefined edge response threshold value until a particular edge response for a particular frame is less than the predefined edge response threshold;
        identifying the particular frame as a first frame in an advertisement break;
        generating an edge response for frames subsequent to the first frame in the identified advertisement break until a particular subsequent edge response for a particular subsequent frame is greater than the predefined edge response threshold;
        identifying the particular subsequent frame as a last frame in the identified advertisement break; and
        storing data associated with the first frame and the last frame in the identified advertisement break in the video database and associated with the retrieved digital video file.

2. The system of claim 1, wherein the advertisement break identification module further executes the steps of:
    extracting an audio signal from the digital video file corresponding to the identified advertisement break;
    performing a Fourier transform on the extracted audio signal to produce a plurality of frequency values;
    calculating an average frequency value from the plurality of frequency values; and
    if the average frequency value is outside of a predetermined audio frequency range, validating the identified advertisement break.

3. The system of claim 1, wherein the advertisement break identification module further executes the step of verifying that edge responses for each of a preselected number of frames subsequent to the particular frame are less than the predefined edge response threshold before identifying the particular frame as a first frame in an identified advertisement break.

4. The system of claim 1, wherein the advertisement break identification module further executes the step of verifying that edge responses for each of a preselected number of frames subsequent to the particular subsequent frame are greater than the predefined edge response threshold before identifying the particular subsequent frame as a last frame in the identified advertisement break.

5. The system of claim 1, wherein the advertisement break identification module further executes the step of associating metadata with the first frame and the last frame of the identified advertisement break in the digital video file.

6. The system of claim 5, wherein the metadata provides an instruction to a digital video player to skip past the identified advertisement break during display of the digital video file to a viewer.

7. The system of claim 5, wherein the metadata provides an instruction to a digital video player to retrieve an advertisement for display during the identified advertisement break during display of the digital video file to a viewer.

8. The system of claim 1, wherein the identified advertisement break comprises all frames of the digital video file between the identified first frame and last frame.

9. The system of claim 8, wherein the advertisement break identification module further executes the step of removing the advertisement break from the digital video file.

10. The system of claim 1, wherein the generated edge response for each frame is generated via a Canny edge detection algorithm.

11. The system of claim 1, wherein the generated edge response for each frame comprises the number of pixels associated with edge features in each frame.

12. The system of claim 1, wherein the data associated with the first frame and the last frame in the identified advertisement break comprises frame numbers of the respective frames.

13. The system of claim 1, wherein the data associated with the first frame the last frame in the identified advertisement break comprises time codes of the respective frames.

14. A method for identifying an advertisement break in a digital video file, comprising the steps of:
    receiving a digital video file, the digital video file comprising a plurality of frames;
    generating an edge response comprising calculating the total number of edge pixels associated with an edge of a frame for frames in the plurality of frames comparing the edge response against a predefined edge response threshold value until a particular edge response for a particular frame is less than the predefined edge response threshold;
    identifying the particular frame as a first frame in an advertisement break;
    generating an edger response for frames subsequent to the first frame in the identified advertisement break until a particular subsequent edge response for a particular subsequent frame is greater than the predefined edge response threshold;

identifying the particular subsequent frame as a last frame in the identified advertisement break; and storing data associated with the first frame and the last frame in the identified advertisement break in association with the digital video file, whereby the stored data associated with the first frame and the last frame in the identified advertisement break is used for manipulation of the digital video file when the digital video file is displayed to a viewer.

15. The method of claim 14, further comprising the steps of:

extracting an audio signal from the digital video file corresponding to the identified advertisement break;

performing a Fourier transform on the extracted audio signal to produce a plurality of frequency values;

calculating an average frequency value from the plurality of frequency values; and if the average frequency value is outside of a predetermined audio frequency range, validating the identified advertisement break.

16. The method of claim 14, further comprising the step of verifying that edge responses for each of a preselected sumter of frames subsequent to the particular frame are less than the predefined edge response threshold before identifying the particular frame as a first frame in an advertisement break.

17. The method of claim 14, further comprising the step of verifying that edge responses for each of a preselected number of frames subsequent to the particular subsequent frame are greater than the predefined edge response threshold before identifying the particular subsequent frame as a last frame in the identified advertisement break.

18. The method of claim 14, wherein the stored data associated with the first frame and the last frame of the identified advertisement break comprises metadata.

19. The method of claim 18, wherein the manipulation of the digital video file comprises automatically skipping past the identified advertisement break during display of the digital video file to the viewer.

20. The method of claim 18, wherein the manipulation of the digital video file comprises retrieving an advertisement for display during the identified advertisement break during display of the digital video file to the viewer.

21. In a computer network, a method for identifying an advertisement break in a digital video file, comprising the steps of:

receiving a digital video file, the digital video file comprising a plurality of frames;

extracting a selected subset of frames from the plurality of frames in the digital video file;

calculating an edge response comprising the total number of edge pixels associated with an edge of a frame for each frame in the selected subset of extracted frames;

upon a determination that the edge response for a particular frame in the selected subset of extracted frames is less than a predetermined edge response threshold by comparing the edge response against the predetermined edge response threshold, identifying the particular frame as an advertisement break start frame;

upon a determination that the edge response for a frame subsequent to the particular frame in the selected subset of extracted frames is greater than the predetermined edge response threshold, identifying the subsequent frame as an advertisement break stop frame; and associating metadata indicative of an identified advertisement break with the advertisement break start frame and advertisement break stop frame in the digital video file.

22. The method of claim 21, wherein the metadata provides an instruction to a digital video player to automatically skip from the advertisement break start frame to the advertisement break stop frame during display of the digital video file to a viewer.

23. The method of claim 21, wherein the identified advertisement break comprises all frames of the digital video file located between the advertisement break start frame and the advertisement break stop frame.

24. The method of claim 23, further comprising the step of deleting all frames associated with the identified advertisement break from the digital video file.

25. The method of claim 21, wherein the selected subset of frames includes each frame in the digital video file.

* * * * *